A. F. PITKIN.
ARTICULATED STAY BOLT.
APPLICATION FILED FEB. 27, 1922.
1,430,321. Patented Sept. 26, 1922.
-FIG. 1.-
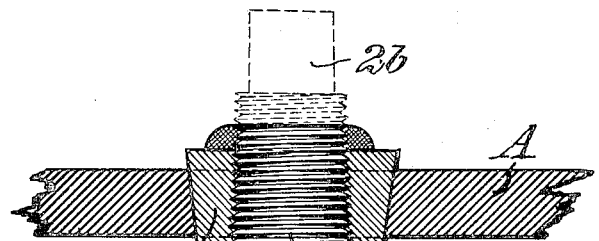
-FIG. 2.-
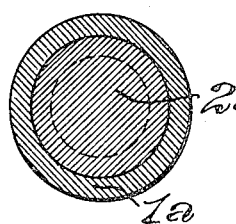
-FIG. 3.-
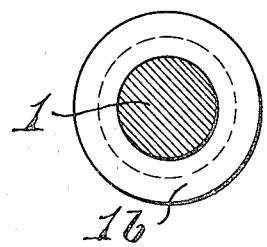
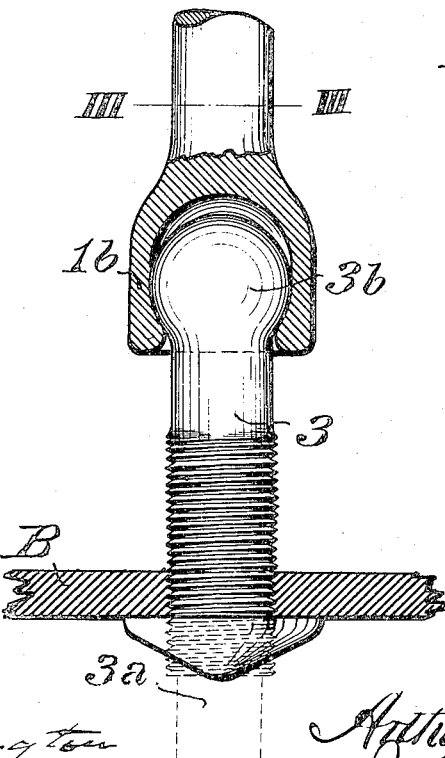
WITNESSES
INVENTOR
Arthur F. Pitkin Patented Sept. 26, 1922.

1,430,321

UNITED STATES PATENT OFFICE.

ARTHUR F. PITKIN, OF SCHENECTADY, NEW YORK.

ARTICULATED STAY BOLT.

Application filed February 27, 1922. Serial No. 539,665.

*To all whom it may concern:*

Be it known that I, ARTHUR F. PITKIN, a citizen of the United States, residing at Schenectady, in the county of Schenectady and State of New York, have invented a certain new and useful Improvement in Articulated Stay Bolts, of which improvement the following is a specification.

My invention relates to stay bolts for steam boilers, and more particularly to that type of stay bolts ordinarily known as "flexible," in which the bolt structure comprises a plurality of parts or sections, connected together by articulations.

With stay bolts of this type, some difficulty has heretofore been experienced in the process of installing them, and securely fastening the end sections in the respective sheets of the boiler firebox on account of the articulation of the parts. The object of my present invention is to provide an improved construction and method whereby the stay-bolt may be readily inserted in the proper position, then securely held during the upsetting and riveting of one of the end sections in one of the boiler sheets, and afterward securely fastening the other end section in the other boiler sheet, with the bolt at the proper tension.

The improvement claimed is hereinafter fully set forth.

In the accompanying drawing: Figure 1 is a view, partly in side elevation, and partly in section, illustrating an embodiment of my invention; and, Figs. 2 and 3, transverse sections, on the lines I—I and II—II, respectively, of Fig. 1.

In practice, my invention is employed in connection with stay bolts composed of a plurality of parts or sections articulated together, and in the drawing, I have shown one form of stay bolt comprising three sections, a main section, 1, having the sockets, 1$^a$ and 1$^b$, at its ends; an outer end section, 2, having a ball, 2$^a$, fitting the socket, 1$^a$; and an inner end section, 3, having a ball, 3$^b$, fitting the socket, 1$^b$, of the main section. The outer end section, 2, is provided with a tapered threaded shank, fitting a correspondingly tapered threaded opening in a plug, 4, which is adapted to be secured in the outer boiler sheet, A, by welding, or in any other suitable manner. The inner end section, 3, is provided with a threaded shank, adapted to engage a threaded opening in the inner boiler sheet, B, and be further secured thereto by upsetting and riveting over the end.

On account of the play or looseness of the articulations of the members, it is sometimes difficult to securely hold the bolt structure during the riveting process, but according to my improvement this is accomplished as follows: The tapered threaded shank of the outer end section, 2, is first screwed into the tapered opening in the plug, 4, until the same is tight. The bolt structure, with the plug, is then inserted into the openings in the boiler sheets, A and B, the plug, 4, being rigidly secured in the outer sheet, A, by welding or otherwise, and the inner end section, 3, being screwed into the threaded opening in the inner sheet, B, by applying a wrench to its squared end, 3$^a$, within the fire box. The end section, 3, is thus screwed up until the bolt structure is subjected to the desired tension. The outer section, 2, is then unscrewed in the threaded plug, by applying a wrench to the outside squared end, 2$^b$, until the loose play of the articulated or ball and socket joints is taken up, and all sections butt against each other in end to end contact. A holder may then be applied to the outer end of the section, 2, while the inner end, 3$^a$, is upset and headed over upon the plate, B, the force of the blows being transmitted through the rigidly held sections of the bolt to the holder at the outer end. After the inner section is riveted, the outer end section, 2, is again screwed into the tapered threaded opening in the plug, 4, until the thread is tight, when it will occupy the same position as before loosened, and the bolt structure will be restored to the desired tension.

If desired, the outer end, 2$^b$, may then be cut off and welded, to further secure the joint and make a neat finish.

I claim as my invention and desire to secure by Letters Patent:

1. In an articulated stay bolt structure, the combination of a plug, adapted to be secured in an outer boiler sheet, said plug having a tapered threaded opening; an outer bolt section having a tapered threaded shank, fitting said opening and provided with a ball at its inner end, and a main bolt section having a socket.

2. In an articulated stay bolt structure, the combination of a plug, adapted to be secured in an outer boiler sheet, said plug having a tapered threaded opening; an outer bolt section having a tapered threaded shank, fitting said opening, an inner bolt section, having a threaded shank adapted to be secured to an inner boiler sheet; and a main bolt section having ball and socket connections with said outer and inner sections.

ARTHUR F. PITKIN.

Witnesses:
LEONARD FAIRLEE,
D. S. COLMAN.